(12) United States Patent
Gasanov et al.

(10) Patent No.: US 6,615,401 B1
(45) Date of Patent: Sep. 2, 2003

(54) BLOCKED NET BUFFER INSERTION

(75) Inventors: Elyar E. Gasanov, Moscow (RU);
Valery B. Kudryavtsev, Moscow (RU);
Andrey A. Nikitin, Moscow (RU)

(73) Assignee: LSI Logic Corporation, Milpitas, CA (US)

( * ) Notice: Subject to any disclaimer, the term of this patent is extended or adjusted under 35 U.S.C. 154(b) by 13 days.

(21) Appl. No.: 10/092,195

(22) Filed: Mar. 6, 2002

(51) Int. Cl.[7] .............................................. G06F 17/50
(52) U.S. Cl. ................................ 716/12; 716/6; 716/8; 716/9; 716/10; 716/13; 716/14; 701/209; 714/726; 257/265
(58) Field of Search ........................... 716/2, 5–10, 12, 716/13, 14–19; 714/726; 701/209; 370/402; 257/264

(56) References Cited

U.S. PATENT DOCUMENTS 6,006,025 A * 12/1999 Cook et al. .................... 716/14
6,415,427 B2 * 7/2002 Nitta et al. ..................... 716/10
6,480,991 B1 * 11/2002 Cho et al. ....................... 716/8

OTHER PUBLICATIONS

Aipert et al., "Steiner Tree Optimization for Buffers, Blockages and Bays", Apr. 4, 2001, Computer_Aided Design of Integrated Circuits and Systems, IEEE Transactions vol.: 20 Issue, pp.; 556–562.*

Srinivasan et al., "Mole–a sea–of–gates detailed router", Dec. 1990, Design Automation Conferenc, 1990, EDAC, Proceedings of the European, pp.: 446–450.*

* cited by examiner

Primary Examiner—Vuthe Siek
Assistant Examiner—Y Rossoshek
(74) Attorney, Agent, or Firm—Luedeka, Neely & Graham PC

(57) ABSTRACT

A method of determining a desired connection path between a pair of points of a net separated by one or more blockages, while reducing path delays and ramp time violations and without placing buffers within any of the blockages.

12 Claims, 3 Drawing Sheets

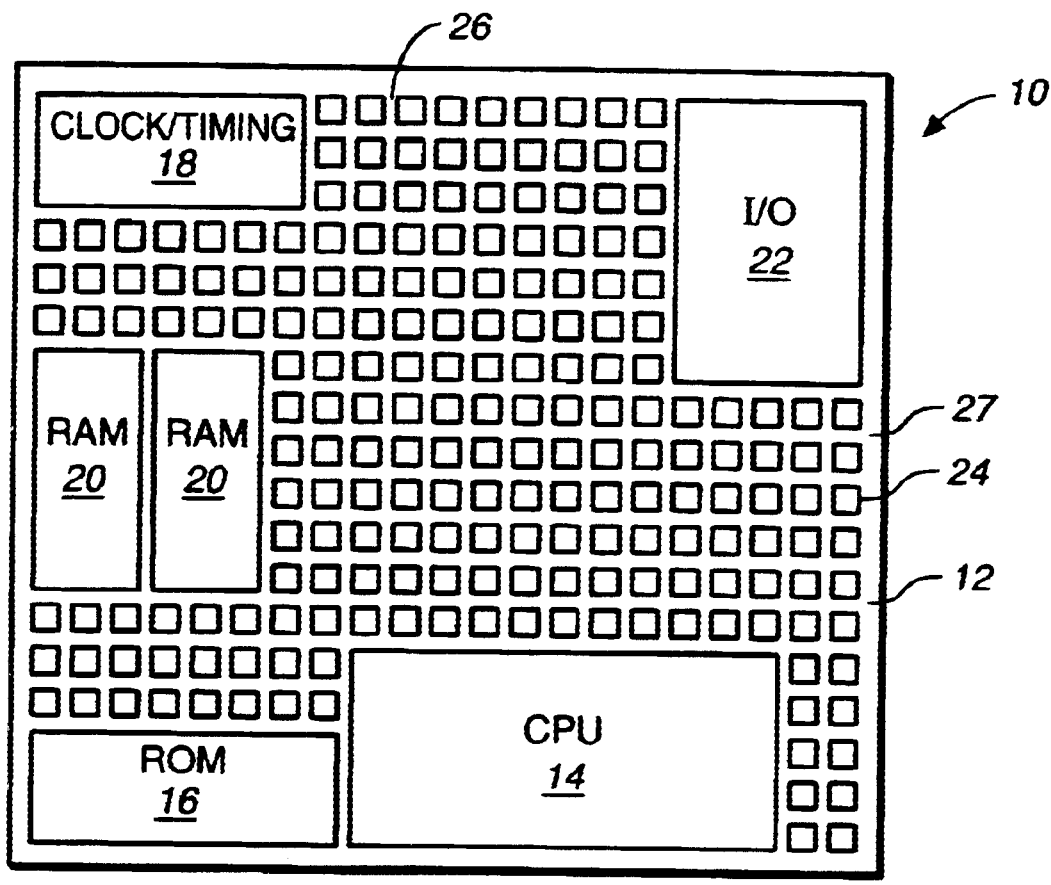
FIG._1

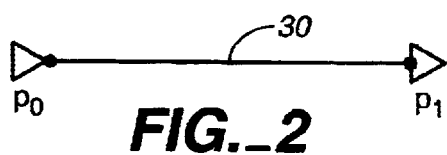
FIG._2
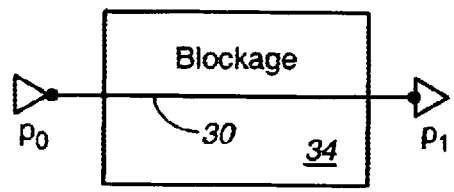
FIG._3
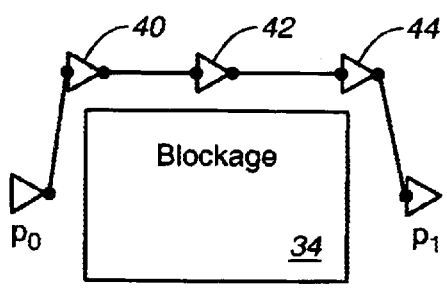
FIG._4
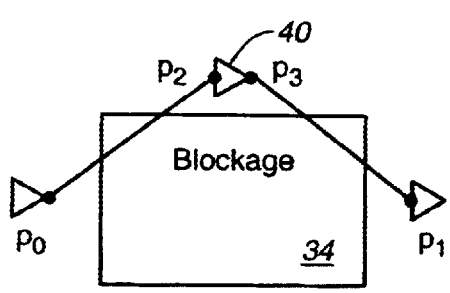
FIG._6
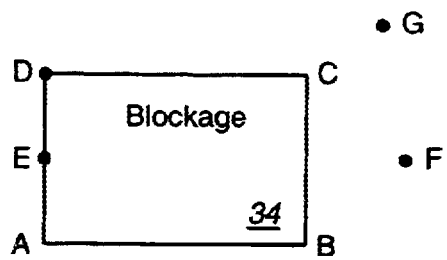
FIG._7
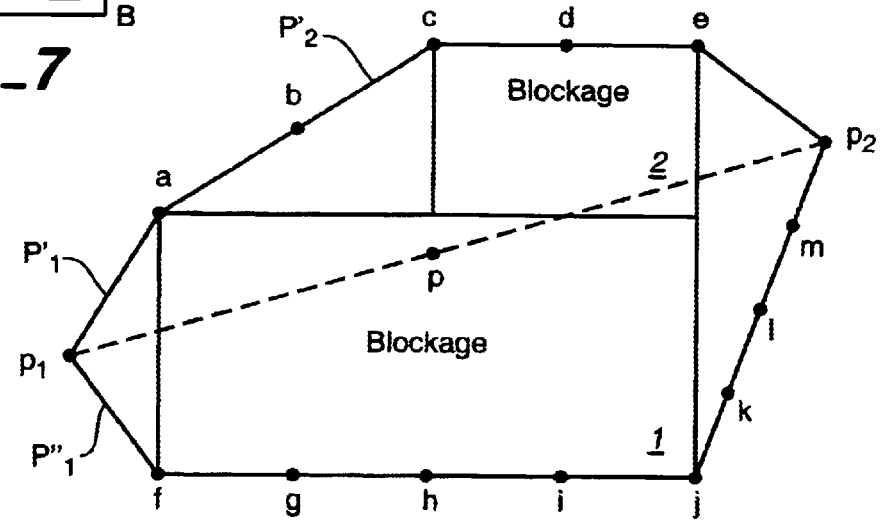
FIG._8

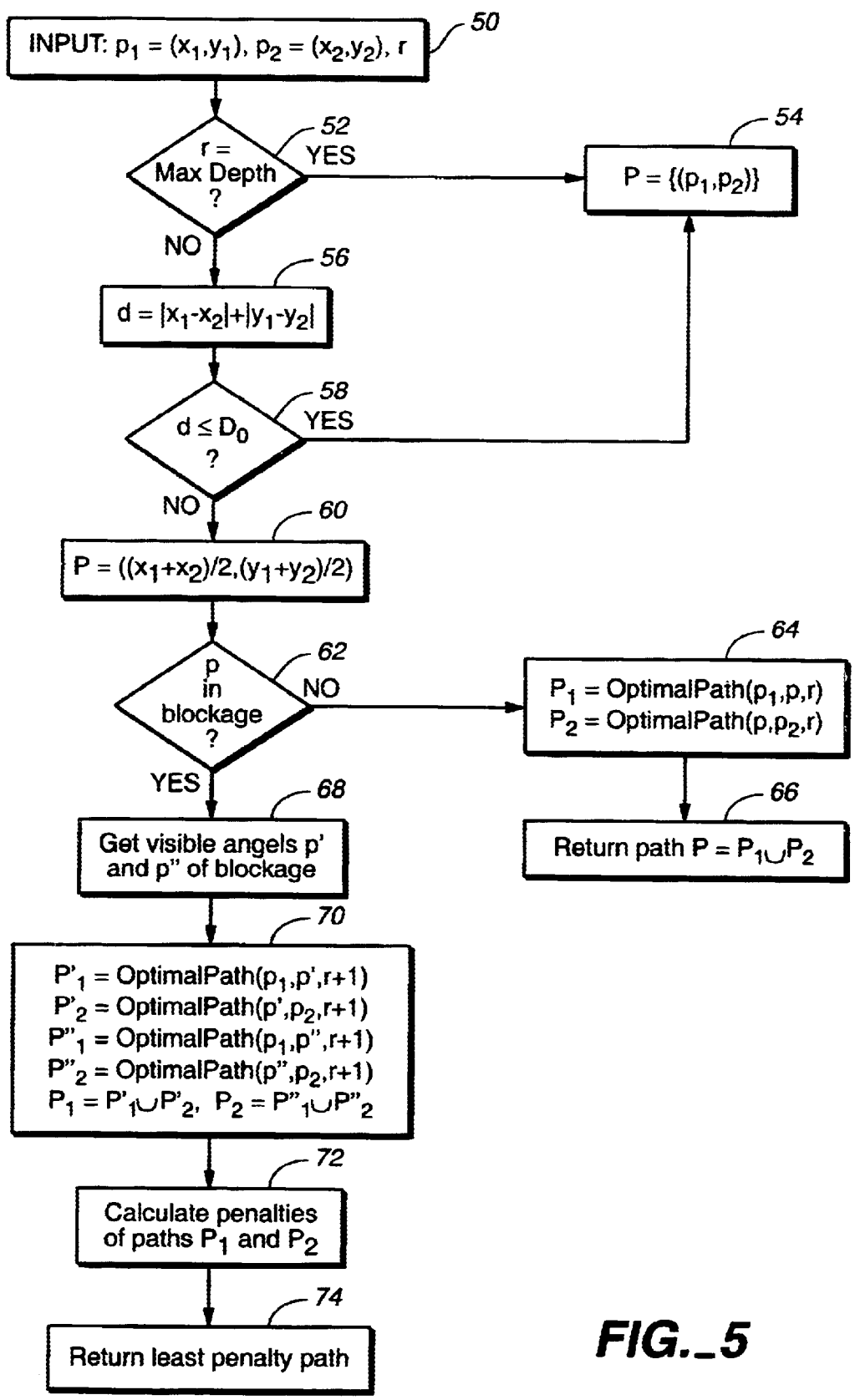
FIG._5

ＵＳ 6,615,401 B1

BLOCKED NET BUFFER INSERTION

FIELD

This invention relates to the field of integrated circuit design. More particularly, this invention relates to a method and system for timing optimization during integrated circuit design.

BACKGROUND

Integrated circuits consist of a large number of electronic components having individual logic devices or groups of logic devices, which are formed on a substrate, typically a silicon wafer. The components, or cells, are typically grouped to reduce the size and increase the speed of the integrated circuit. Each cell has one or more pins that are connected by wires to one or more pins of other cells of the integrated circuit. The pins are structures that function as the input or output of a cell, and the wires are structures that function as the interconnections between cells. A net is a set of pins connected by a set of wires.

Placement of the components in optimum positions provides efficient layout of the components in the integrated circuit, and tends to reduce integrated circuit costs, signal delays, size, and the like. Because integrated circuits typically contain hundreds of thousands if not millions of components, the task of optimizing the placement of components on in integrated circuit is typically not practical without the aid of computerized layout tools.

Designers address timing issues associated with the propagation of signals from one cell to another. For the integrated circuit design to function properly, the numerous signals that are transmitted between cells of the net are typically synchronized. Thus, designers make allowance for the delays inherent in the components of the integrated circuit and the routing between the components. Thus, faster routes must be synchronized with slower routes for the integrated circuit to function properly.

In addition to ensuring that electrical and timing aspects of the integrated circuit design are attended to, the physical layout of an integrated circuit can also present rigorous problems for the designer to overcome. For example, design constraints having a high priority may place some components in certain areas of the integrated circuits, which components may later become effectual blockages to other components having design constraints with a low priority. Thus, the low priority components need to be rerouted around the high priority blockages. Such rerouting must also take in to consideration the timing issues discussed below.

There is a need, therefore, for a method of routing a net around blockages, especially large blockages, whereby the net is effectively rerouted and timing considerations are accounted for.

SUMMARY

The above and other needs are met by a method of determining a desired connection path between a pair of points of a net separated by one or more blockages which will avoid path delays and ramp time violations without placing buffers within any of the blockages.

In a preferred embodiment, the method includes the steps of identifying a constructed path between the pair of points of the net, identifying the distance between the pair of points corresponding to the constructed path and comparing the distance to an optimal distance value, calculating a middle point of the constructed path when the distance between the pair of points corresponding to the constructed path is greater than the optimal distance value, and determining if the middle point is covered by a blockage.

If the middle point is not covered by a blockage, the union of each path between the middle point and each of the points of the pair of points is identified as the desired connection path, If the middle point is covered by a blockage, visible angles of the blockage are determined. Next, first and second paths extending between the points of the pair of points and passing through at least one of the determined visible angles of the blockage are determined. Penalties for the first and second paths are then determined and compared. The one of the first and second paths having the least penalties is then selected as the desired connection path.

In another aspect, a computer program having logic elements for accomplishing the foregoing steps is provided.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIG. 1 is a representational diagram of an integrated circuit,

FIG. 2 is a representational diagram of a net made up of interconnected cells of an integrated circuit, FIG. 3 is a representational diagram of a net having a blockage, FIG. 4 shows a buffer insertion scheme for the net of FIG. 3 determined in accordance with a preferred embodiment of the invention, FIG. 5 is a flow chart of preferred steps in a method for determining a buffer insertion scheme for nets having blockages, FIG. 6 is a representational diagram of a first constructed path for a simplified buffer insertion scheme, FIG. 7 is a representational diagram illustrating visible angles in connection with a net blockage, and FIG. 8 is a representational diagram illustrating selection of an optimal path between two points separated by a blockage, according to a complex buffer insertion procedure.

DETAILED DESCRIPTION

Referring now to FIG. 1 there is shown an integrated circuit 10 provided on a substrate 12, such as a silicon wafer, having a plurality of components made by layering various materials on the substrate 12. The arrangement of the components on the substrate 12 is described in terms of a geometric description referred to as a layout, characterized by a plurality of planar geometric shapes separated from one another and arranged on the substrate 12. Masks or patterns corresponding to the layout are used to render the desired shapes in the desired locations on the substrate 12 in a series of photolithographic steps.

For example, the circuit 10 includes a plurality of functional circuit blocks formed thereon, such as central processing unit 14, read-only memory (ROM) 16, clock/timing unit 18, random access memories (RAM) 20, and input/ output interface (I/O) 22. The circuit 10 also includes numerous (e.g., from about 10,000 to several million) cells 24. The cells 24 and the other components of the circuit 10 are interconnected or routed according to a desired logical design of the circuit corresponding to a desired application. This routing or interconnection is accomplished by electrically conductive lines or traces located such as in vertical channels 26 and horizontal channels 27 between the cells 24.

Each cell 24 corresponds to a logic element, such as a gate, or to a combination of logic elements interconnected to perform a specific function. The cells 24 are typically grouped to produce a device such as an application specific integrated circuit. Each cell 24 has one or more pins that are connected by wires to one or more pins of other cells of the circuit. A net is the set of pins connected by the wire. An example of a net 30 is shown in FIG. 2. In FIG. 2, $p_0$ is the first output pin of the net 30 and $p_1$ is the last input pin of the net. The pin $p_0$ is referred to as the driver of the net 30 and the pin $p_1$ is the driven pins. Typically, there are a plurality of driven pins, each being designated $p_1$, $p_2$, $p_3$, ..., $p_n$, with n representing the number of driven pins.

As a part of arranging the components of the circuit 10, buffers are added to preferably minimize path delays or to minimize the ramptime violation of the driver of the net. A buffer is a structure that propagates the same signal that it receives, without logical modification. Placement of the buffers is complicated when a net contains one or more blockages. A blockage is a region of the net where cells, including buffers, cannot be placed, and over which wires of the net cannot be routed. Thus, a net scheme is preferably determined to reduce path delays and ramp time violations without placing buffers within the blockage.

FIG. 3 is a representational diagram of the net 30 crossing a blockage 34. The wire between the driven pin $p_1$ and the driving pin $p_0$ represents a path having too great a length such that the net 30 has a ramptime violation. The invention relates to a method for determining an appropriate buffer insertion scheme for nets such as net 30 having blockages, especially large blockages, to reduce net delays and avoid ramp time violations. FIG. 4 represents a finished complex buffer insertion scheme according to a preferred embodiment of the invention, wherein buffers 40, 42, and 44 are inserted into the net 30 to define a new path in accordance with an iterative optimization method. The path 46 is selected to reduce both path delays and ramptime violations without passing through the blockage 34.

For reasons as given more completely below, a simplified buffer insertion procedure cannot always be used, because it tends to produce the net as depicted in FIG. 6, which has ramptime violations. Thus, according to the procedure described herein, the simplified buffer insertion procedure is used in those situations where it produces acceptable results, and a more detailed buffer insertion procedure is used in those situations where the more simplified buffer insertion procedure does not produce acceptable results.

The input into the overall procedure is a net. For example, if $p_0$ is the driver of the net, $p_1$, ..., $p_n$ are then driven pins of the net. The maximal pin of the net, or in other words the driven pin at the maximal distance from the driver is $p_m$, where m is at least one and no greater than n. The maximal distance of this pin $p_m$ is denoted by $d_m$. If $d_m$ is less than or equal to $D_0$, then the simplified buffer insertion procedure may be appropriately used to determine the modifications to be applied to the input net. $D_0$ is an optimal distance between two buffers of the same type of chain and is preferably calculated as follows:

$$D_0 = (\text{MaxCapacity}(p_{out}) - \text{PinCapacity}(p_{in}))/(\text{UnitCapacity})$$

Where:

$p_{out}$ is the output pin of the buffer, $p_{in}$ is the input pin of the buffer, MaxCapacity is the maximal allowed capacity of the net driven by the pin $p_{out}$, PinCapacity is the capacity of the driven pin $p_{in}$, and UnitCapacity is a coefficient selected such that UnitCapacity×WireLength(p) equals the capacity of the wire, where WireLength(p) is equal to the length of the wire connecting the driven pin $p_{in}$ with the driver.

An example of a simplified buffer insertion procedure is given with more detail hereafter.

However, if $d_m$ is greater than $D_0$, then the more detailed or complex procedure to construct an optimal path is applied to the input net, which detailed procedure is also described with more detail below.

SIMPLIFIED BUFFER INSERTION PROCEDURE

The main complexity of the simplified buffer insertion procedure is to choose a subset of driven pins, which are designated to the new buffer, which become the new driving pin for the selected subset of driven pins. There are many ways in which a subset of driven pins can be chosen. For example, all subsets of the initial set of driven pins can be examined one by one and the best subset can be selected. This method gives the best simplified solution, but has a complexity that is exponential with the number of driven pins.

As a more preferred alternative, the driven pins are sorted by some feature. For example, during a resynthesis procedure there is preferably performed a ramptime optimization and a timing optimization. During the ramptime optimization stage, the following value is preferably calculated for each driven pin p:

$$\text{Cap}(p) = \text{PinCapacity}(p) + \text{UnitCapacity} \times \text{WireLength}(p)$$

The driven pins are preferably sorted in decreasing order of the calculated values. During the timing optimization stage, MaximalTime(p) is calculated for each driven pin p, and the driven pins are sorted in increasing order of the calculated values. For example, if the set $\{p_1, \ldots, p\}$ is the sorted set of driven pins, the subsets $S_i = \{p_1, \ldots, p_i\}$ are examined step by step, and the best subset is selected. This method provides acceptable results and has linear complexity, rather than the exponential complexity of the method first listed above.

However, as mentioned above, such simplified procedures tend to produce the flawed results as depicted in FIG. 6 where the wires of the net have lengths that create ramptime violations.

DETAILED BUFFER INSERTION PROCEDURE

Turning now to FIG. 5, there is shown a flow chart of preferred steps in a complex method for determining the path for buffer insertions. In an initial step 50, input information is selected corresponding to the path to be constructed by inserting a buffer. The output to eventually be realized by the complex procedure is depicted in FIG. 8. Each of the depicted pins is considered to be a point on the integrated circuit having an abscissa location (x) and an ordinate location (y). In a preferred embodiment, the first point of the initial constructed, path is $p_1$, at location $(x_1,y_1)$ and the last point is $p_2$ at location $(x_2,y_2)$. An optimal path P is defined as OptimalPath, where P=OptimalPath $(p_1,p_2,r)$. The r parameter is preferably an integer included to avoid an infinite loop in the iterative method of FIG. 5. Thus, for a given value of r, P is the optimal path connecting the points $p_1$ and $p_2$.

In step 52, r is compared to a parameter MaxDepth, which corresponds to the maximum number of iterations through the procedure, and preferably has a value of from about ten to about fifteen. If r is at least equal to MaxDepth, then at step 54 the procedure returns the currently determined optimal path of $P=\{(p_1,p_2)\}$.

If it step 52 the input parameter r is less than MaxDepth, then at step 56 the distance $d=|x_1-x_2|+|y_1-y_2|$ between points $p_1$ and $p_2$ is calculated. At 58, the value for d calculated in step 52 is compared to the distance $D_0$. If d is less than or equal to $D_0$, then the procedure returns to step 54 to present the current path as the optimal path. If d is greater than $D_0$, the procedure continues to step 60.

In step 60, a middle point p is calculated, where $p=((x_1+x_2)2,(y_1+y_2)2)$. In the next step 62, the method checks whether the middle point p is covered by a blockage. The circuit is preferably divided into square logical sections using horizontal and vertical lines. Each of the sections is preferably referred to as a tile s. A characteristic B(s) is assigned to each tile s, where B(s) is equal to zero if the tile is not covered by any blockages, and B(s)=n if the tile s is covered by n blockages. A blockage is considered to be large if both sides of the blockage are greater than $D_0$.

If the midpoint p is not covered by a blockage, then the procedure proceeds to step 64. In step 64, (and with reference back to step 50) the program recursively calls itself twice, first for the input parameters $(p_1,p,r)$, and secondly for the input parameters $(p,p_2,r)$, where $P_1$=OptimalPath$(p_1,p,r)$ and $P_2$=OptimalPath$(p,p_2,r)$. At step 66, the path P is returned as the union of paths $P_1$ and $P_2$, e.g., $P=P_1 \cup P_2$.

If at step 62 the point p is covered by some blockage n, then at step 68 visible angles p' and p" of the blockage n are determined for the point $p_1$. For example, with reference to FIG. 7, the angles A and C are "visible" for point D. Thus, if a point is located in the side of a blockage, the ends of the side are referred to as "visible." As a further example of this, it is seen that the angles A and D are visible for the point E. Therefore, it is understood that if a point is located outside a blockage and only two angles are visible from the point, then the angles are considered as visible from the point. As an example of this, it is understood that the angles B and C are visible from the point F. However, if a point is located outside of a blockage and more than two angles are visible from the point, then the two outer angles are considered as visible, but the interior angles are not considered as visible. Thus, in FIG. 7, the angles B and D are understood to be visible from the point G.

In step 70, the procedure recursively calls itself four times to obtain four paths:

$P'_1$=OptimalPath$(p_1,p',r+1)$ $P'_2$=OptimalPath$(p',p_2,r+1)$ $P''_1$=OptimalPath$(p_1,p'',r+1)$ $P''_2$=OptimalPath$(p'',p_2,r+1)$ Where p' and p" are the two visible angles from point $p_1$. A first path $P_1$ is defined as the union of the first and second paths, e.g., $P_1=P'_1 \cup P'_2$ and a second path $P_2$ is defined as the union of the third and fourth paths, e.g., $P_2=P''_1 \cup P''_2$.

In step 72, penalties are calculated for the paths $P_1$ and $P_2$ obtained in step 70. The penalty of a path P is defined as a pair k(P), Violation(P), where k(P) is the number of edges of the path and Violation(P) is the violation of the path. An edge is a pair of pints $(p_1,p_2)$. The violation of a path is the sum of the violations of the edges of the path. For example, for a path between points $p_1$ and $p_2$, where $p_1=(x_1,y_1)$ and $p_2=(x_2,y_2)$, the violation of the edge $(p_1,p_2)$ equals max$\{0,$ PinCapacity$(p_i)+(|x_1-x_2|+|y_1-y_2|)$ X UnitCapacity−MaxCapacity$(p_0)\}$, where $p_i$ is the input pin and $p_o$ is the output pin of the edge. In this example it is assumed that the wire between $p_1$ and $p_2$ is routed orthogonally rather than directly. If the wire between $p_1$ and $p_2$ is routed directly, then the length of the wire is determined using the quadratic equation with the point coordinates as the input.

In step 74, the penalties obtained in step 72 for the paths $P_1$ and $P_2$ are compared and the least penalty path is selected. That is, if Violation$(P_1)$<Violation$(P_2)$ or Violation$(P_1)$=Violation$(P_2)$ and $K(P_1) \leq K(P_2)$, then $P_1$ is selected as the least penalty path. Otherwise, $P_2$ is selected.

For further example with reference to FIG. 8, there is depicted a pair of points $p_1$ and $p_2$ separated by a pair of blockages, Blockage 1 and Blockage 2. Applying the procedure of FIG. 5, it is seen that the middle point p is covered by Blockage 1. The points a and f are visible angles of Blockage 1 for point $p_1$. The path $P'_1$ connecting the point $p_1$ and a is equal to $\{(p_1,a)\}$. The optimal path $P''_2$ connecting the points a and $p_2$ is equal to $\{(a,b),(b,c),\ldots,(e,p_2)\}$. The path $P''_1$ connecting the points $p_1$ and f is equal to $\{(P_1,f)\}$. The optimal path $P''_2$ connecting the points f and $p_2$ is equal to $\{(f,g),(g,h),\ldots,(m,p_2)\}$. The path $P_1=\{(p_1,a),(a,b),(b,c),(e,p_2)\}$ is better than the path $P_2=\{(p_1,f),(fg),(g,h),\ldots,(m,p_2)\}$ in this example, because it is determined to be shorter and requires fewer buffer insertions. At each point between two pins, if a ramptime violation is determined, the procedure is called to determine another point at which to insert a buffer. In many instances, a simple buffer insertion procedure is sufficient, but in other instances the complex procedure is required.

The detailed buffer insertion process is preferably input with the point $p_0$, $p_m$, and r=0. The path generally referred to as $P=\{(p_0,p'_1),(p'_1,p'_2),\ldots,(p'_k,p_m)\}$ is the result of the procedure. To determine the actual position at which the added buffer is to be inserted, the point $(x'_j,y'_j)$ is determined, where $(x'_j,y'_j)$ is the point closest to the point $p'_j$ where $j=1,\ldots,k$, such that buffer $C_{opt}$ can be placed at $(x'_j,y'_j)$. The point $(x'_j,y'_m)$ can be determined with the help of a density driven procedure to assign cell coordinates, such as that described in copending U.S. patent application Ser. No. 09/841,824 filed Apr. 25, 2001, the entirety of which disclosure in incorporated herein by reference.

A total of k buffers $C_{opt}$ are inserted and coordinates $(x'_j,y'_j)$ are assigned to the $j^{th}$ buffer for each $j=1,\ldots,k$. The pin $p_0$ is connected with the input pin of the first buffer, the output pin of the $j^{th}$ buffer is connected with input pin of the $(j+1)^{th}$ buffer for each $j=1,\ldots,k-1$, and the output pin of the $k^{th}$ buffer is connected with the pin $p_m$. The obtained buffer tree is returned as a result of the procedure.

CONCLUSION

In this manner, a method is presented for determining a net scheme for points separated by one or more blockages which preferably reduces path delays and ramp time violations without placing buffers within any of the blockages. The method includes determining if there is a ramptime violation, locating a midpoint between the two pins if there is a ramptime violation, determining whether the midpoint lies within a blockage, if the midpoint lies within a blockage then looking for a visible angles of the blockage, determining the best visible angle, and then looking at the edge between the new point and the original driven pin. If the new edge also has a ramptime violation, then the method is recursively called. When all of the new points around the blockages have been located, a buffer location routine is called to determine the nearest acceptable buffer location to the new points. The method is preferably incorporated as part of a timing driven resynthesis procedure wherein the circuit is tested for proper temporal relationships of the applied and produced electrical signals of the circuit and then modified in an attempt to optimize the temporal relationships.

Preferably, once the timing resynthesis is completed and all timing issued with the integrated circuit design have been resolved, the integrated circuit design is used to create mask layers and process flows whereby the integrated circuit design is physically embodied in an integrated circuit.

In other embodiments, the method of the invention is embodied in a computer program on a physical media, which computer program has logic elements for instructing a computing device to accomplish the method as described above. The invention may also be embodied in a computing device having inputs, outputs, memory, and a processor, which function in cooperation to accomplish the method described above.

The foregoing embodiments of this invention have been presented for purposes of illustration and description. They are not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. A method of determining a desired connection path between pair of points of a net separated by one or more blockages, while reducing path delays and ramp time violations and without placing buffers within any of the blockages, the method comprising the steps of:
   identifying a constructed path between the pair of points of the net,
   identifying a distance between the pair of points corresponding to the constructed path and comparing the distance to an optimal distance value,
   calculating a middle point of the constructed path when the distance between the pair of points corresponding to the constructed path is greater than the optimal distance value,
   determining if the middle point is covered by a blockage,
      when the middle point is not covered by a blockage, identifying a union of each path between the middle point and each of the points of the pair of points as the desired connection path, and
      when the middle point is covered by a blockage, determining visible angles of the blockage and identifying first and second paths extending between the points of the pair of points and passing through at least one of the determined visible angles of the blockage, and
   identifying penalties for the first and second paths, comparing the penalties for the first and second paths, and selecting one of the first and second paths having the least penalties as the desired connection path.

2. The method of claim 1, wherein the blockage has a pair of visible angles and the first path is the union of a first intermediate path between one of the pair of points and a first one of the visible angles and a second intermediate path between the first one of the visible angles and the second point of the pair of points, and the second path is the union of a third intermediate path between one of the pair of points and a second one of the visible angles and a fourth intermediate path between the second one of the visible angles and the second point of the pair of points.

3. The method of claim 1, wherein the method is iterative and subsequent iterations of the steps are conducted using as input the selected one of the first and second paths determined in an immediately preceding iteration of the steps.

4. The method of claim 3, further comprising an initial step of comparing an input maximum desired number of iterations value to a counter that counts a number of actual iterations and stopping the method if the input maximum desired number of iterations value is at least equal to the number of actual iterations.

5. A computer program on a computer readable media, the computer program physically embodying a method of determining a desired connection path between a pair of points of a net separated by one or more blockages, while reducing path delays and ramp time violations and without placing buffers within any of the blockages, the computer program comprising logic elements for:
   identifying a constructed path between the pair of points of the net,
   identifying a distance between the pair of points corresponding to the constructed path and comparing the distance to an optimal distance value,
   calculating a middle point of the constructed path when the distance between the pair of points corresponding to the constructed path is greater than the optimal distance value,
   determining if the middle point is covered by a blockage,
      when the middle point is not covered by a blockage, identifying a union of each path between the middle point and each of the points of the pair of points as the desired connection path, and
      when the middle point is covered by a blockage, determining visible angles of the blockage and identifying first and second paths extending between the points of the pair of points and passing through at least one of the determined visible angles of the blockage, and
   identifying penalties for the first and second paths, comparing the penalties for the first and second paths, and selecting one of the first and second paths having the least penalties as the desired connection path.

6. The program of claim 5, wherein the blockage has a pair of visible angles and the logic element for identifying first and second paths comprises a logic element for identifying the first path as the union of a first intermediate path between one of the pair of points and a first one of the visible angles and a second intermediate path between the first one of the visible angles and the second point of the pair of points, and for identifying the second path as the union of a third intermediate path between one of the pair of points and a second one of the visible angles and a fourth intermediate path between the second one of the visible angles and the second point of the pair of points.

7. The program of claim 5, wherein the logic elements are iterative and subsequent iterations of the logic elements are conducted using as input the selected one of the first and second paths determined in an immediately preceding iteration of the logic elements.

8. The program of claim 7, further comprising an initial logic element for comparing an input maximum desired number of iterations value to a counter that counts a number of actual iterations and stopping the iteration if the input maximum desired number of iterations value is at least equal to the number of actual iterations.

9. A computing device for determining a desired connection path between a pair of points of a net separated by one or more blockages, while reducing path delays and ramp time violations and without placing buffers within any of the blockages, the computing device comprising an input for receiving information in regard to the net, and a processor for:
   identifying a constructed path between the pair of points of the net,
   identifying a distance between the pair of points corresponding to the constructed path and comparing the distance to an optimal distance value,
   calculating a middle point of the constructed path when the distance between the pair of points corresponding to the constructed path is greater than the optimal distance value,
   determining if the middle point is covered by a blockage,
      when the middle point is not covered by a blockage, identifying a union of each path between the middle point and each of the points of the pair of points as the desired connection path, and
      when the middle point is covered by a blockage, determining visible angles of the blockage and identifying first and second paths extending between the points of the pair of points and passing through at least one of the determined visible angles of the blockage, and
   identifying penalties for the first and second paths, comparing the penalties for the first and second paths, and selecting one of the first and second paths having the least penalties as the desired connection path.

10. The computing device of claim 9, wherein the blockage has a pair of visible angles and the logic element for identifying first and second paths comprises a logic element for identifying the first path as the union of a first intermediate path between one of the pair of points and a first one of the visible angles and a second intermediate path between the first one of the visible angles and the second point of the pair of points, and for identifying the second path as the union of a third intermediate path between one of the pair of points and a second one of the visible angles and a fourth intermediate path between the second one of the visible angles and the second point of the pair of points.

11. The computing device of claim 9, wherein the processor operates iteratively and subsequent iterations are conducted using as input the selected one of the first and second paths determined in an immediately preceding iteration.

12. The computing device of claim 11, wherein the processor initially compares an input maximum desired number of iterations value to a counter that counts a number of actual iterations and stops the iteration if the input maximum desired number of iterations value is at least equal to the number of actual iterations.

* * * * *